US011212964B2

(12) United States Patent
Bhavani

(10) Patent No.: US 11,212,964 B2
(45) Date of Patent: Jan. 4, 2022

(54) METHOD OF CONTROLLING AN AUTOMATED DRONE FOR HARVESTING PRODUCE

(71) Applicant: Amrita Vishwa Vidyapeetham, Tamil Nadu (IN)

(72) Inventor: Rao R. Bhavani, Kerala (IN)

(73) Assignee: Amrita Vishwa Vidyapeetham

( * ) Notice: Subject to any disclaimer, the term of this patent is extended or adjusted under 35 U.S.C. 154(b) by 318 days.

(21) Appl. No.: 16/563,004

(22) Filed: Sep. 6, 2019

(65) Prior Publication Data

US 2020/0022308 A1 Jan. 23, 2020

Related U.S. Application Data

(62) Division of application No. 15/285,970, filed on Oct. 5, 2016, now Pat. No. 10,555,460.

(30) Foreign Application Priority Data

Oct. 5, 2015 (IN) .............................. 5319/CHE/2015

(51) Int. Cl.
*A01D 46/24* (2006.01)
*A01D 46/30* (2006.01)

(52) U.S. Cl.
CPC ............. *A01D 46/30* (2013.01); *A01D 46/24* (2013.01)

(58) Field of Classification Search
CPC ...... A01D 46/24; A01D 46/253; A01D 46/30; B64C 39/024; B64C 2201/00–22
See application file for complete search history.

(56) References Cited

U.S. PATENT DOCUMENTS

| 3,606,750 | A | * | 9/1971 | Walker et al. | .......... | A01D 46/28 56/331 |
| 4,532,757 | A | * | 8/1985 | Tutle | ..................... | A01D 46/24 382/110 |
| 8,251,307 | B2 | * | 8/2012 | Goossen | ............... | B64C 39/024 244/23 C |
| 8,306,663 | B2 | * | 11/2012 | Wickham | ............... | A01D 46/30 700/259 |
| 8,590,828 | B2 | * | 11/2013 | Marcus | ................. | B64C 39/024 244/17.23 |
| 9,382,003 | B2 | * | 7/2016 | Burema | ................ | B64C 39/024 |

(Continued)

*Primary Examiner* — Adam J Behrens
(74) *Attorney, Agent, or Firm* — Donald R. Boys; Central Coast Patent Agency LLC

(57) ABSTRACT

A system for harvesting produce from a tree has a drone capable of hovering, a video camera gathering visual data of movement, a cutting implement, a remote control station with a display screen, wireless circuitry, and input mechanisms to control movement of the drone and operation of the cutting implement, and circuitry in the body of the drone enabling two-way communication with the remote control station, transmission of video data from the video camera, and response to commands from the remote control station. The video data from the camera on the drone is displayed on the display screen of the remote control station, and an operator viewing the display screen operates the input mechanisms, maneuvering the drone to position the cutting implement relative to produce in the tree, and triggers the cutting implement by command, severing a stem to separate the produce, causing the produce to fall from the tree.

4 Claims, 3 Drawing Sheets

(56) References Cited

U.S. PATENT DOCUMENTS

| | | | | |
|---|---|---|---|---|
| 9,420,748 B2* | 8/2016 | Chan | .................. | A01G 3/08 |
| 9,462,749 B1* | 10/2016 | Jens | .................. | A01D 46/30 |
| 9,468,152 B1* | 10/2016 | Jens | .................. | G06K 9/00657 |
| 9,527,588 B1* | 12/2016 | Rollefstad | .................. | G05D 1/0005 |
| 9,944,366 B2* | 4/2018 | Tang | .................. | B63C 9/01 |
| 10,011,352 B1* | 7/2018 | Dahlstrom | .................. | B64C 39/024 |
| 10,195,629 B1* | 2/2019 | Dahlstrom | .................. | B64C 39/022 |
| 2016/0082460 A1* | 3/2016 | McMaster | .................. | B05B 12/122 |
| | | | | 701/2 |
| 2016/0353661 A1* | 12/2016 | Caldeira | .................. | A01H 1/027 |
| 2018/0043386 A1* | 2/2018 | Busby | .................. | B64C 39/024 |

* cited by examiner

METHOD OF CONTROLLING AN AUTOMATED DRONE FOR HARVESTING PRODUCE

CROSS-REFERENCE TO RELATED DOCUMENTS

The present application is a Divisional application of co-pending application Ser. No. 15/285,970, filed on Oct. 5, 2016, which claims priority to a provisional patent application filed on Oct. 5, 2015 in India, bearing Serial Number 5319/CHE/2015, disclosure of which is incorporated herein at least by reference.

BACKGROUND OF THE INVENTION

1. Field of the Invention

The present invention is in the field of agriculture and pertains particularly to methods and apparatus for harvesting produce from trees.

2. Discussion of the State of the Art

In tropical countries, harvesting coconuts is an important agricultural function. The importance of exported coconuts is highlighted primarily by its importance in local and international markets, including many domestic, commercial, and industrial uses. At the time of this writing the value of coconuts worldwide is rising, causing an increase in production rates. The meat of the coconut is found in many recipes. The kernel of the coconut is utilized for making oil, and the shell of the coconut is utilized in charcoal production. Coir of the coconut (husk fiber) is used in the manufacture of door mats, floor mats, brushes, mattresses, filler materials for organic compounds, coir brick for plantation, handicrafts and so on. Coir may be harvested from ripe (brown coir) or unripe (white coir) coconuts. The white coir may be used for manufacturing finer brushes, string, rope, and fishing nets.

In current art, coconut harvesting is largely a manual operation requiring agricultural workers to climb up the trees in order to access the coconuts at the top. Workers have been in high demand for coconut harvesting, but more recently have dwindled in numbers due to other opportunities becoming available in their local areas. This puts a strain on product output and contributes to higher demand and higher prices on the export market. Manual harvesting of coconuts carries risks in that the workers must climb the trees to harvest. Additional risk to workers includes a possibility of local poisonous insects being in the coconut clusters being harvested.

More recently, attempts have been made to introduce semi-automatic machines that may be manually or remotely controlled to harvest coconuts. Such known machines are modular machines that may be attached to the trunk of a coconut tree, whereby a retractable arm having a cutting or clipping head may be operated by a human who carries and attaches the machine to the tree to cut the coconuts from the tree. A challenge with this approach is that many tree trunks have structure and anomalies that may limit this type of semi-automated harvesting. Other drawbacks include vulnerable mechanics of the known machines, and poor accuracy of the machine cutting or harvesting arm, which are pneumatic and require fluid for retraction and extension.

Therefore, what is needed in the art is a coconut harvester that overcomes the drawbacks stated above and can be operated without engaging the trunk of the coconut tree.

BRIEF SUMMARY OF THE INVENTION

In one embodiment of the invention a system for harvesting produce from a tree is provided, comprising a drone having a body, and capable of hovering flight, a video camera on the body of the drone gathering visual data of drone movement, a cutting implement carried by the body of the drone, a remote control station having a display screen, wireless communication circuitry, and input mechanisms enabling commands to control movement of the drone and operation of the cutting implement, and circuitry in the body of the drone enabling two-way communication with the remote control station, transmission of video data from the video camera, and response to commands from the remote control station. The video data from the camera on the drone is displayed on the display screen of the remote control station, and an operator viewing the display screen operates the input mechanisms, maneuvering the drone to position the cutting implement relative to produce in the tree, and triggers the cutting implement by command, severing a stem to separate the produce, causing the produce to fall from the tree.

In one embodiment the tree is a coconut tree, and the produce is a coconut. Also in one embodiment the cutting implement is a laser. Also in one embodiment the system further comprises a harvesting arm attached to the body of the drone, extending substantially horizontally, with the cutting implement mounted at an end of the harvesting arm away from the body of the drone.

In one embodiment the harvesting arm is an articulated arm, capable of one or both of extension and lateral movement. In one embodiment the cutting implement is a laser mounted on a body capable of being rotated by command. In one embodiment the system further comprises first software executing on a first processor in the drone, and second software executing on a second processor in the remote control station, the software enabling at least semi-automatic operation of the drone, to fly to different groves of trees, and to different trees, for harvesting produce. And in one embodiment execution of the software further provides visual analysis of color of produce in video data from the video camera, determining suitability of the produce for harvest.

In another aspect of the invention a method for harvesting produce from a tree is provided, comprising displaying video images from a video camera mounted on a body of a drone on a display screen of a remote control station, operating input mechanisms at the remote control station, transmitting commands wirelessly to the drone to maneuver the drone to a particular position near produce hanging in a tree, and remotely triggering operation of a cutting implement mounted on a body of the drone, severing a stem to separate the produce, causing the produce to fall from the tree.

In one embodiment of the method the tree is a coconut tree, and the produce is a coconut. Also in one the cutting implement is a laser, which is triggered to provide a laser beam to cut a stem. Also in one embodiment there is further a harvesting arm attached to the body of the drone, extending substantially horizontally, with the cutting implement mounted at an end of the harvesting arm away from the body of the drone, and positioning the drone involves positioning the harvesting arm relative to produce. IN one embodiment the harvesting arm is an articulated arm, capable of one or both of extension and lateral movement, and the arm is operated to extend or to move laterally to facilitate cutting a stem. And in one embodiment the cutting implement is a laser mounted on a body capable of being rotated by command, and the laser body is rotated to sweep the laser beam to accomplish a cutting operation.

In one embodiment the method further comprises first software executing on a first processor in the drone, and second software executing on a second processor in the remote control station, the software enabling at least semi-automatic operation of the drone, to fly to different groves of trees, and to different trees, for harvesting produce. And in one embodiment execution of the software further provides visual analysis of color of produce in video data from the video camera, determining suitability of the produce for harvest.

DETAILED DESCRIPTION OF THE INVENTION

In various embodiments described in enabling detail herein, the inventor provides a unique system for harvesting produce from trees. The present invention is described using the following examples, which may describe more than one relevant embodiment falling within the scope of the invention.

Figure 1:
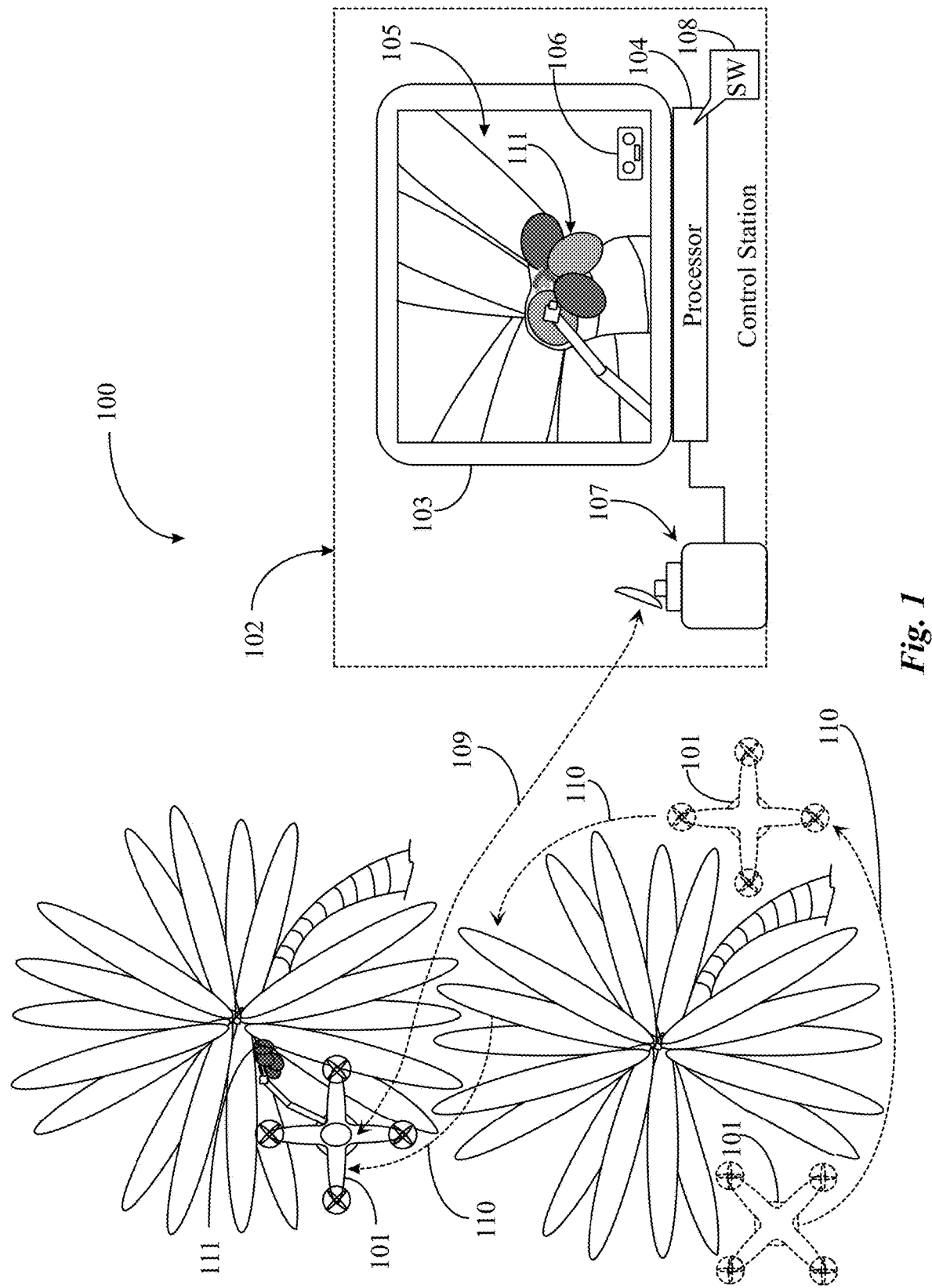
FIG. 1 is an architectural diagram depicting a fruit harvesting area that is harvested using a drone according to an embodiment of the present invention.

FIG. 1 is an architectural diagram depicting a harvesting area 100 where coconuts may be harvested using a drone 101 according to an embodiment of the present invention. Harvesting area 100 is a coconut grove in this example, and drone 101 is harvesting coconuts. However, this should not be construed as a limitation to the spirit and scope of the present invention. The harvesting area 100 may be a banana tree grove or some other produce trees that may be typically harvested by climbing or by machine apparatus reaching into the tree.

Drone 101 may be controlled from a control station 102, which may on premises or within wireless range of drone 101 performing a harvest routine. In one embodiment control station 102 is mobile and may be set up near the trees where produce is being harvested. Control station 102 may include a computer display 103 for displaying visual information gathered by equipment carried by drone 101 in operation. Computer display 103 is supported by a computer processor 104 running a software application (SW) 108. SW 108 may be a programmable drone application that sets up and maintains communications between the station and one or more drones in operation. SW 108 may also include flight instructions, and dedicated harvesting SW routines programmed therein for, in this particular case, coconut harvesting.

Processor 104 has data connection to a communications transceiver 107, which operates to transmit commands to drone 101 in the field and to receive real time audio/video data from drone 101 through a like transceiver facility (RX/TX) provided on drone 101. An operator at control station 102 may, with the aid of SW 108, control and accomplish flight patterns of one or more drones. The operator may also instruct one or more drones to harvest (cut fruit at stem) based on analysis of drone output data by the operator and/or automated SW interface.

In this example drone 101 has traveled on a flight path 110 directed by an operator at control station 102, based on the visual data sent to the control station by the drone. In this implementation, a flight path controller 106 is provided via SW 108. The operator may manipulate the flight path controller presented on screen 105 that also displays the drone video stream.

In one embodiment physical flight controls are provided as part of the drone equipment. The video stream may or may not include audio. In one implementation, at least one video camera having a global positioning system (GPS) location capability is installed at or proximal to a cutting implement such as a laser cutter on the drone. In this example drone 101 has a mechanical arm with a camera and a laser module at the free end of the arm. The arm may be operated from control station 102 with the aid of processor 104 running SW 108.

Drone 101 may send video 105 to control station 102 for real time display on computer display 103. Video 105 depicts a close up view of coconuts 111 as captured by a video camera mounted somewhere on the drone near the mechanical arm. It is noted herein that there may be more than one video camera capturing video, such as one on the drone body that captures the mechanical arm and laser module and one on the laser module to capture close-up of the coconut stems for cutting. The operator may toggle video feeds or have both feeds active on display 103 in a split-screen mode.

In this example of drone harvesting, control station 102 has located coconut trees and activated a drone to fly to the area. The flight path of drone 101 illustrates that the drone was flown around a first tree according to flight path 110 the drone represented in broken boundary to show past tense. The first tree was passed because there are no coconuts to be harvested in the first tree. Drone 101 may have harvested them, they may have not been ripe enough to harvest, or there may not have been any coconuts in the tree. In any case, the operator is presently working on the tree having ripe coconuts 111, and has a mechanical arm and laser extended for laser cutting, while drone 101 hovers in place. In one embodiment, the operator may determine whether a coconut might be harvested based on its overall color. In this view the coconuts have slightly different colors (shading) for illustration purposes.

In another embodiment, a video camera operated by drone 101 may determine the harvest status of a coconut independently of the operator, using color analysis and GPS or other determined location of the coconut relative to the harvest drone. A laser module enables cutting a coconut stem using laser light generation and emission, which cuts the coconut stem without disturbing the flight-holding pattern of the drone. Such a laser cutting module may also be used to trim away foliage that may, in some instances, prevent drone 101 from getting close enough to the target coconuts 111.

Drone 101 may be powered by a battery or battery pack and therefore, may be flown periodically to a charging station (not illustrated) for charging during harvest of multiple trees. In a simple embodiment, the harvested coconuts simply fall to earth after drone cutting. In one embodiment, the coconuts may be captured by a net or other capture device placed in the drop path of each nut or a pod of nuts. For a lager operation there may be a fleet of harvester drones operated from more than one control station manned by drone operators.

SW 108 may execute a flight path program that may automatically accomplish an automated flight path for a drone, in as far as getting it to a proper area and to a first tree to visit. An operator may take over from there, or each tree location may already be programmed into the drone application, such that the GPS location of each tree is sent to the drone after or at the time the drone is finished with the previous tree. In one embodiment an operator at station 103 may, through controller 106 or a physical peripheral piece of equipment, control the drone flight and laser cutting.

Figure 2:
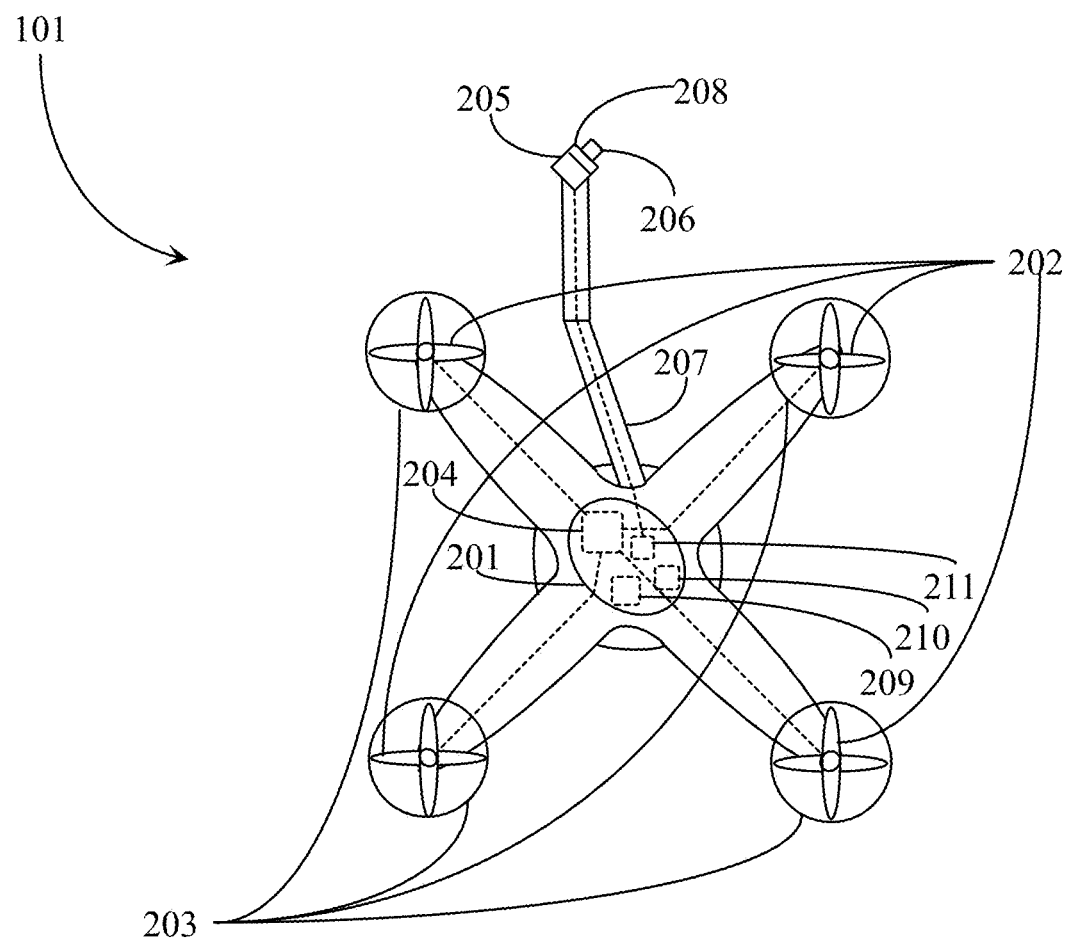
FIG. 2 is an overhead view of the drone harvesting vehicle of FIG. 1 according to an embodiment of the present invention.

FIG. 2 is an overhead view of drone harvesting vehicle 101 of FIG. 1 according to an embodiment of the present invention. Drone 101 in this example includes an engine compartment 201, or space for housing an electric engine. Drone 101 is supported and propelled in flight by propellers 202. Propellers 202 are protected in rotation by propeller ring guards 203. Propellers 202 are controlled through a propeller controller unit 204 within engine compartment 201.

Drone 101 in this example includes an articulated mechanical arm 207. Mechanical arm 207 may be a jointed mechanical arm or a telescopic extension arm, or both, without departing from the spirit and scope of the present invention. In one embodiment mechanical arm 207 may be hydraulically controlled or a combination of hydraulic (liquid or gas) and electrical servo mechanical control. Articulation is not an absolute requirement for the invention, and such an arm may be rigid in some embodiments. Also in some alternative embodiments there may be no arm at all.

Mechanical arm 207 in this example supports a laser module 205 as a cutting implement. Laser module 205 may be located at or near the end of mechanical arm 207, and may be in one embodiment rotated about an axis to move the laser path in a horizontal manner. Servo operation enables a laser gun 206, mounted on the laser module, to assume a correct angle for cutting coconut stems or other materials with a laser beam. Laser gun 206 may be controlled through a laser controller unit 211 mounted within the engine compartment in this example. Controller 211 may include a wireless signal transceiver (RX/TX) enabling control a feedback from the ground control station.

In some alternative embodiment the cutting implement may be scissor-like implement, or a rotating blade element, or another sort of implement capable of cutting a stem of a coconut or other hanging produce.

In the current example a ground operator may signal laser controller 211 (equipped with a transceiver) using a physical controller or a virtual on-screen controller aide by SW 108 of FIG. 1. The operator may command the laser to charge, cut, stop cut, and power down, among other operations. The operator may further select power level of the laser beam in one implementation. For example, foliage may be easier to cut through then a stem, therefore, in one embodiment two differing power levels may be programmed into controller 211, one for cutting standard foliage and one for cutting thicker stems.

In one embodiment, an operator may program a harvester drone like drone 101 to make a series of automated actions during flight that rely on interpretation or at least dissemination of video captured by the drone, wherein the operator relies on the drone (SW) interpretation of content captured. This may be accomplished by integrating specific sensors and optical recognition SW, and perhaps addition of echo sensors to determine size, and distance or depth sensors to determine exact position relative to a common focal point on the drone.

Drone 101 may further include a power regulation unit 210 that may regulate power to the mechanical arm, the laser module, and the propeller engine. If powered by a battery pack, SW or firmware (FW) may be provided on a processing unit integrated into the drone operation system that economically regulates power and may inform a control station operator for example, when a drone may need to stop for charging. In one embodiment drone 101 is equipped with solar power-generating panels that may at least contribute to charging the system.

Figure 3:
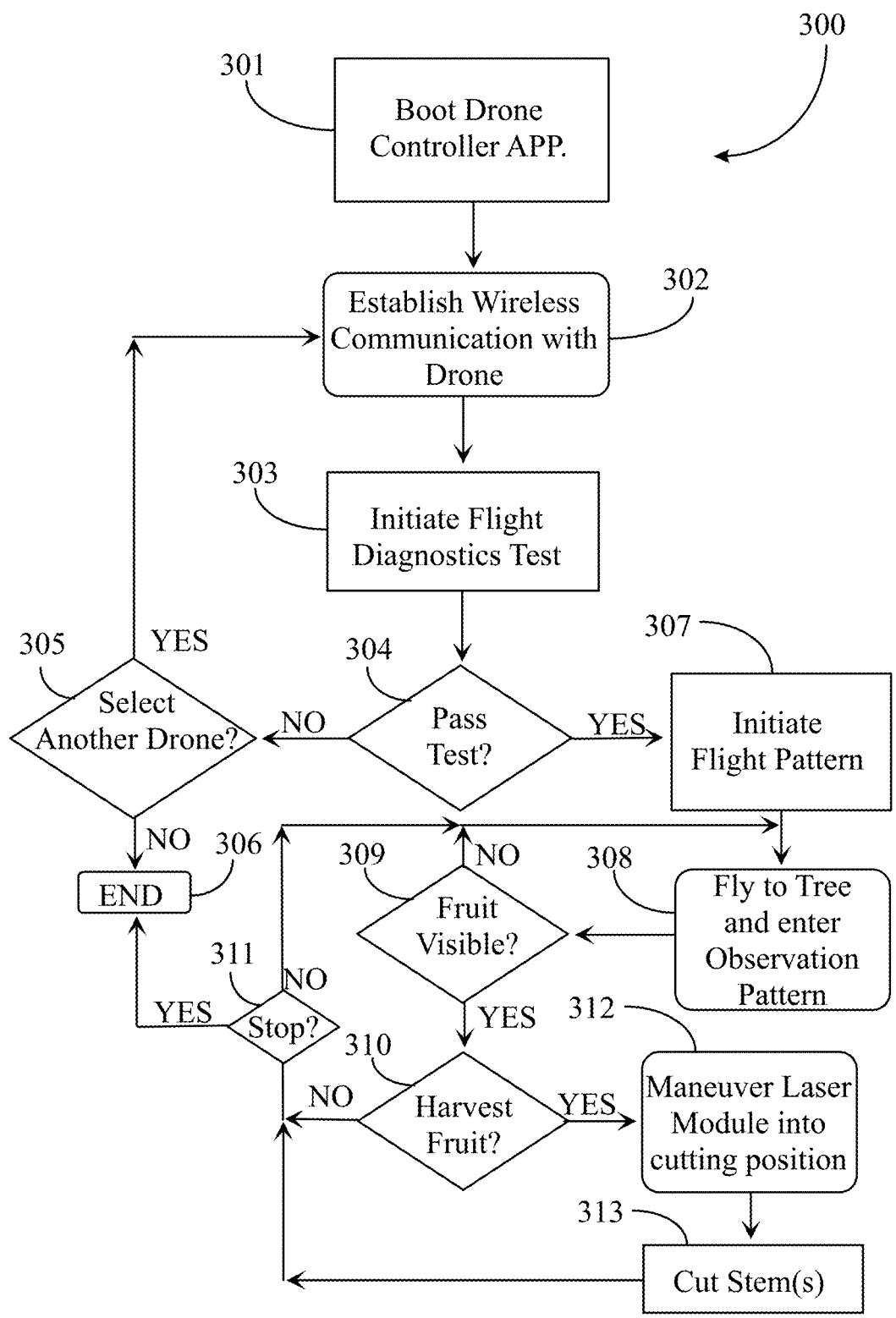
FIG. 3 is a process flow chart depicting steps for locating and harvesting fruit using a drone.

FIG. 3 is a process flow chart 300 depicting steps for locating and harvesting produce using a drone. At step 301 an operator may boot drone control application (SW 108, FIG. 1). The operator may establish wireless communications with a drone at step 302. In one aspect of the process an operator may initiate a standard flight diagnostics test at step 303 to ensure the selected drone is able and ready to harvest. This test may include a charge test, a rotor test, propeller test and laser operation test. Such a test may be automated with feedback to the operator.

At step 304, the application may determine whether a particular drone has passed a diagnostic flight test of step 303. If the drone did not pass at step 303, the process may move to step 305 where the operator may determine to select another available drone for harvesting. This step assumes there may be more than one available drone that may be part of a fleet, for example. If at step 305 the operator determines to select another drone the process may loop back to step 302 where wireless communications are established with the new drone. That drone may also be subject to a flight diagnostics test. If at step 305 the operator determines not to select another drone, the process may end at step 306.

If a selected drone passes a diagnostics test at step 304, the operator may initiate or execute a flight pattern or instruction for the drone at step 307. Such an instruction may be transmitted from the control station to the drone over a wireless connection such as, but not limited to, Bluetooth, Zigbee or any other wireless technologies. In one implementation, the flight routine may be an automated instruction that executes on the drone and controls flight according to previously programed parameters including location coordinates and other pertinent information that the drone may use to affect a successful flight to the trees.

In another implementation, the operator controls the drone flight manually using a controller and a visual aid (camera feed) from the moment the drone clears the diagnostic test for flight. In this embodiment the operator may see the flight area from the perspective of the drone by means of a video camera the provides a live and continuous feed of, at least, what is in front of the drone. At step 308, the operator or an automated flight instruction may fly the drone to a first tree for harvesting. In this step the drone may enter into an observation pattern to determine if there is produce in the tree for harvest. In one implementation, the operator flies the drone around the tree with continuous video feed to allow the operator to spot produce in the tree and to determine whether it is in a condition for harvesting. In one implementation, an optical recognition SW may be loaded onto a drone processor to enable optical color recognition of the produce in the tree so that the drone may make the determination that there is harvestable produce in a tree independently from the operator.

At step 309, a determination may be made whether there is produce visible in a tree. This determination may be made by the operator or by an optical recognition application running on the drone or at the control station receiving live feed from the drone. If there is determined there are no items to harvest, the process may loop back to step 308 and the drone may fly to a next tree and enter an observation flight pattern. In an observation pattern the drone may hover and may move around the tree to locate any harvestable produce. If it is determined that produce is available at step 309, then a determination may be made at step 310 whether the produce is ready for harvest by the drone. The actual determination may be made by the operator or by an optical recognition application programmed to assess color of the produce and weigh it against a stored value.

At step 310 if the fruit is not ready for harvest the process may move to step 311 where a determination may be made whether to stop or abort harvesting. If the operator or SW determines to continue harvesting the process may loop back to step 308 where the drone may fly to a next tree. If the operator or SW determines to stop at step 311, the process may end at step 306. If at step 310 the operator or SW determines to harvest, the process moves to step 312 where the operator may maneuver the laser module into a suitable position for cutting the stems. In this step the operator may hover while extending a mechanical arm with the laser module attached at the end.

A camera on the laser module may provide a live feed to the control station from the perspective of the laser gun used to harvest. At step 313, the operator may cut the stems using the laser gun by sending a control signal or command to the laser controller to initiate the laser to cut through the stems. In this embodiment the harvested produce may fall to the ground or into a netting or other catch device that may be placed below the tree. Once all of the produce is harvested from that tree, the process may move back to step 311 and 306 if the determination is to stop, or back to step 308 if the determination is to continue harvesting other trees.

It will be apparent to one with skill in the art that the harvesting system of the invention may be provided using some or all of the mentioned features and components without departing from the spirit and scope of the invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

It will further be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented and in which the software may be provided within the scope of the invention. The invention is limited only by the breadth of the claims below.

The invention claimed is:

1. A method for harvesting produce, comprising:
a drone having a body, and capable of hovering flight, with a first video camera on the body of the drone gathering video data, global positioning system (GPS) circuitry in the drone reporting GPS position of the drone, an articulated arm extending from the body of the drone, the arm capable of extension, retraction and lateral movement relative to the body of the drone, a second video camera mounted at an end of the articulated arm away from the body of the drone, and a laser gun cutting implement mounted at an end of the articulated arm, the laser gun cutting implement adapted to rotate under power to sweep a laser beam around a vertical axis, the laser gun cutting implement having a laser controller with a transceiver, guiding the drone to a tree bearing produce, the drone guided to the tree by software executing on a processor of a remote control station following a pre-stored flight path according to pre-stored GPS location, the remote control station having a display screen, wireless communication circuitry, and input mechanisms enabling an operator to manually enter commands to control flight movement of the drone, operation of the articulated arm, and power and movement of the laser gun cutting implement;
causing the drone to enter an observation pattern at the tree, and to transmit the video data to display on the display screen via circuitry in the body of the drone enabling two-way communication with the remote control station;
determining by observation of the display screen by an operator if there is produce ready to harvest on the tree; and
if there is produce ready to harvest, guiding the drone by manually-entered commands by the operator, positioning the laser gun cutting implement proximate a stem supporting the produce ready to harvest, powering on the laser, and operating the laser gun cutting implement to sweep the laser beam horizontally, cutting the supporting stem, and separating the produce from the tree.

2. The method of claim 1 wherein the tree is a coconut tree, and the produce is a coconut, comprising separating a coconut from the coconut tree.

3. The method of claim 1 wherein the articulated arm extends substantially horizontally, with the laser gun cutting implement mounted at an end of the harvesting arm away from the body of the drone, comprising sweeping the laser beam horizontally at the end of the articulated arm.

4. The method of claim 1 wherein execution of the software further provides visual analysis of color of produce in the tree, in the video data, and determining suitability of the produce for harvest.

\* \* \* \* \*